(12) United States Patent
Bachman

(10) Patent No.: US 8,196,518 B2
(45) Date of Patent: Jun. 12, 2012

(54) HEAD END POWER SYSTEM FOR PASSENGER TRAIN SETS

(75) Inventor: Eric C. Bachman, Oswego, IL (US)

(73) Assignee: Titan Rail, Inc., Oswego, IL (US)

( * ) Notice: Subject to any disclaimer, the term of this patent is extended or adjusted under 35 U.S.C. 154(b) by 0 days.

(21) Appl. No.: 13/012,447

(22) Filed: Jan. 24, 2011

(65) Prior Publication Data
US 2011/0113982 A1 May 19, 2011

Related U.S. Application Data

(62) Division of application No. 11/717,413, filed on Mar. 13, 2007, now Pat. No. 7,891,302.

(51) Int. Cl.
*B61C 3/00* (2006.01)
(52) U.S. Cl. .......................... 105/35; 105/49
(58) Field of Classification Search .................. 105/35, 105/49
See application file for complete search history.

(56) References Cited

U.S. PATENT DOCUMENTS

| | | | |
|---|---|---|---|
| 6,170,587 B1 | 1/2001 | Bullock | |
| 6,591,758 B2 * | 7/2003 | Kumar | 105/35 |
| 6,612,245 B2 * | 9/2003 | Kumar et al. | 105/26.05 |
| 6,612,246 B2 * | 9/2003 | Kumar | 105/34.2 |
| 6,615,118 B2 * | 9/2003 | Kumar | 701/19 |
| 6,873,888 B2 * | 3/2005 | Kumar | 701/19 |
| 6,973,880 B2 * | 12/2005 | Kumar | 105/35 |
| 7,231,877 B2 * | 6/2007 | Kumar | 105/35 |
| 7,237,492 B2 * | 7/2007 | Inarida | 105/35 |
| 7,430,967 B2 * | 10/2008 | Kumar | 105/35 |
| 2002/0177929 A1 * | 11/2002 | Kumar | 701/19 |
| 2006/0005737 A1 * | 1/2006 | Kumar | 105/35 |
| 2006/0005738 A1 * | 1/2006 | Kumar | 105/35 |
| 2006/0005739 A1 * | 1/2006 | Kumar | 105/35 |
| 2007/0137514 A1 * | 6/2007 | Kumar et al. | 105/26.05 |
| 2007/0272116 A1 * | 11/2007 | Bartley et al. | 105/35 |
| 2008/0000381 A1 * | 1/2008 | Bartley et al. | 105/49 |
| 2008/0121136 A1 * | 5/2008 | Mari et al. | 105/35 |
| 2008/0148993 A1 * | 6/2008 | Mack | 105/35 |
| 2008/0223250 A1 * | 9/2008 | Bachman | 105/26.05 |

* cited by examiner

*Primary Examiner* — S. Joseph Morano
*Assistant Examiner* — Jason C Smith
(74) *Attorney, Agent, or Firm* — Duane Morris LLP

(57) ABSTRACT

A passenger locomotive is retrofitted with a hybrid energy head end power (HEP) system to generate head end power that is substantially continuously provided to a passenger railcar while the locomotive, which is operable in a motoring mode and a dynamic braking mode, is in use. The locomotive has a primary power source that provides primary electrical energy to a traction bus to power a traction motor when in the motoring mode. The traction motor generates excess electrical energy when in the dynamic braking mode. The HEP energy storage system generates head end power that is suitable for non-motoring use by a passenger railcar by converting the stored excess electrical energy and primary electrical energy into the head end power and providing the head end power to the HEP bus substantially continuously while the passenger locomotive is in use.

10 Claims, 3 Drawing Sheets

HEAD END POWER SYSTEM FOR PASSENGER TRAIN SETS

This application is a divisional of U.S. patent application Ser. No. 11/717,413, entitled "SYSTEM AND METHOD FOR PROVIDING HEAD END POWER FOR USE IN PASSENGER TRAIN SETS," filed on Mar. 13, 2007 now U.S. Pat. No. 7,891,302.

BACKGROUND

The present invention relates generally to railway train sets, and more particularly, to a system and method for generating head end power for use in passenger train sets.

In many regions of the world, particularly in large cities, passenger rail is a widely used mode of transportation. In these regions, people often use passenger trains to commute to the workplace from suburbs or smaller towns outside the city. The passenger train makes frequent stops and passes through residential areas as well as travels in congested urban areas. A passenger train's travel through these areas is accompanied by high levels of noise and harmful emissions, which is undesirable both for the train's passengers and residents of the area.

Both freight trains and passenger trains generally include a locomotive having a primary power source (e.g., a main generator or alternator) driven by a diesel engine to provide traction power to drive the train's wheels. Both freight and passenger train locomotives also connect to one or more railcars. However, unlike freight railcars, passenger railcars require electrical power for various housekeeping applications unrelated to locomotion, such as heating, cooling, ambient lighting, and energizing electrical outlets. To provide energy to the railcars for these housekeeping applications, locomotives for passenger train sets also include a head end power (HEP) system.

To provide head end power, known HEP systems typically include either a parasitic generator driven by the main (traction) engine in addition to the primary power source or a separate smaller engine/generator set that operates independently of the main engine. Both types of HEP systems have their drawbacks. For instance, because the parasitic generator obtains its energy from the main diesel engine, less horsepower is available for accelerating the train and/or the engine has to maintain higher power output and fuel consumption to sustain the desired cruising speed. While a separate engine/generator set dedicated to non-propulsion purposes would not rob energy from the primary power generator, the use of a separate system translates into higher maintenance costs for the passenger train. In addition, both types of HEP systems produce undesirable levels of high-pitched noise as they utilize generators that run at high RPMs. This noise is particularly bothersome in passenger trains as it affects the comfort of the passengers, bystanders, and residents. Also, both types of systems require the consumption of additional fuel, which again translates into higher costs, as well as increased emission levels. In light of these drawbacks, it would be desirable to provide a low noise HEP system that requires less or even no extra fuel to operate and which does not detract from the primary power available for traction and acceleration.

One source of unused energy available on locomotives is energy generated from dynamic braking. When the train is in the motoring mode, the main engine rotates the primary power source that powers the traction motors which provides the tractive power to drive the train's wheels. When dynamic braking is activated, a dynamic braking control system reconfigures the traction motors as generators which are rotated by the forward momentum of the locomotive and the attached railcars, thus producing electrical energy. This action produces drag on the traction motors/generators and, thus, provides a braking effect. In traditional dynamic braking locomotives, the energy generated by the dynamic braking action is transferred to a resistor grid where it is converted to thermal energy and dissipated through the cooling effect of a fan system. In other words, the excess energy is wasted.

There have been attempts to make productive use of the excess energy generated by dynamic braking. For instance, freight applications have captured the excess energy and then used it to selectively supplement or replace the primary energy provided to the traction motors when in the motoring mode. However, as freight trains do not make frequent stops, dynamic braking in freight applications does not provide enough excess energy for an application where the demand for the energy is continuous. Other applications do not capture the excess energy at all, but instead immediately use the energy as it is generated.

DETAILED DESCRIPTION

Figure 1:
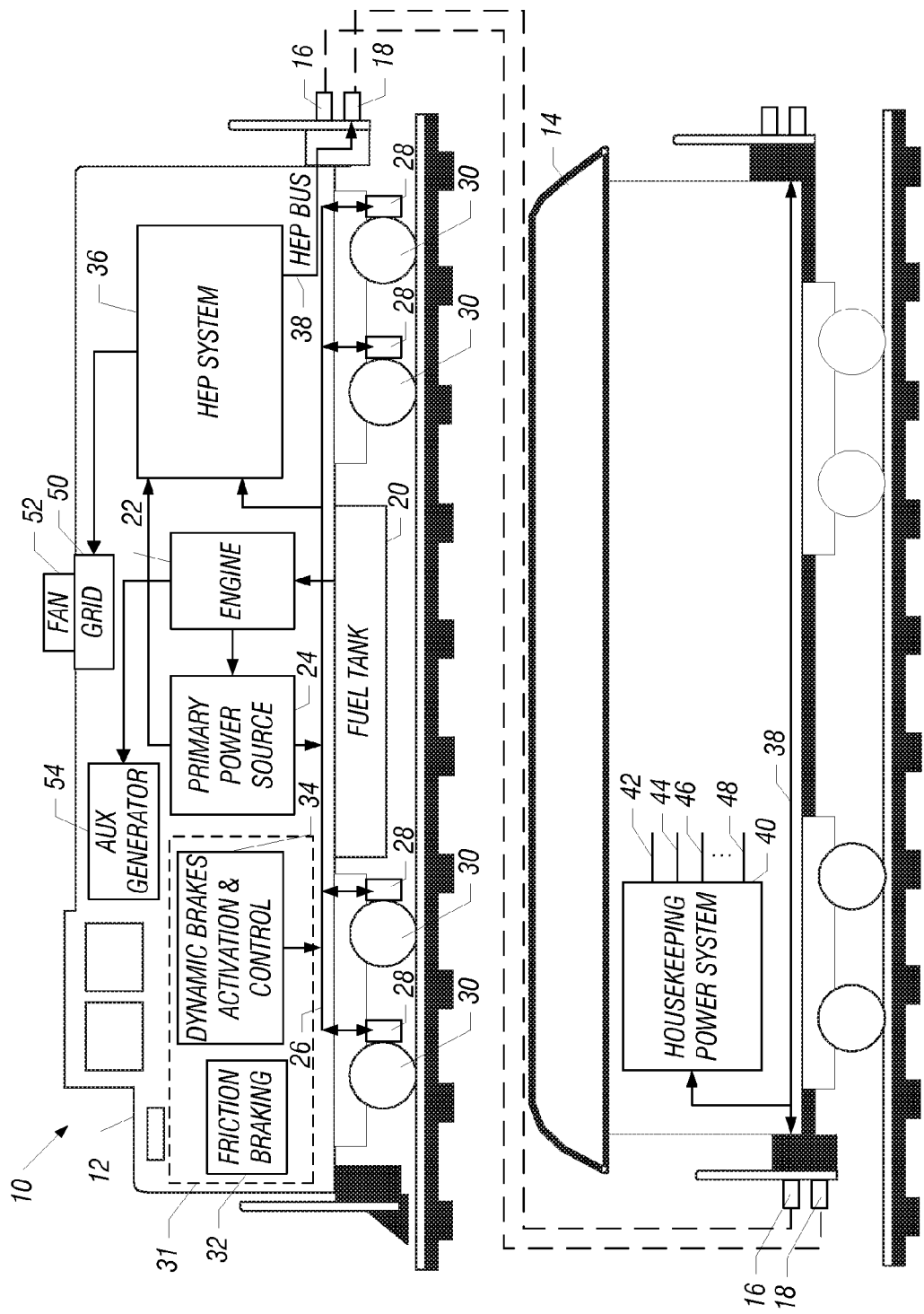
FIG. 1 is a block diagram of an exemplary embodiment of a passenger train set including a locomotive having a hybrid head end power system coupled to a railcar.

FIG. 1 shows an exemplary embodiment of a passenger train set 10 that includes a diesel locomotive 12 and at least one passenger railcar 14. Railcar 14 is mechanically and electrically coupled to locomotive 12 via coupling connections 16 and 18, respectively. In general, locomotive 12 carries a propulsion system 23 (see FIG. 2) that includes a main engine 22, a primary power source 24, a traction bus 26, and a plurality of traction motors 28. Locomotive 12 also carries a fuel tank 20 that provides fuel to the primary engine 22.

The primary power source 24 provides primary power in the appropriate form required by the particular traction bus 26 and may include, for example, a generator, an alternator, etc. Propulsion system 23 is operable in a motoring mode in which train set 10 is moved or accelerated on a track and in a dynamic braking mode in which train set 10 is slowed or brought to a stop. In the motoring mode, main engine 22 drives primary power source 24 which then produces primary electrical energy. The primary electrical energy is transferred to traction bus 26 which is coupled to a plurality of traction motors 28. Traction motors 28, in turn, are coupled to the locomotive wheels 30 through a gear system. When traction motors 28 are receiving primary power from primary power source 24, traction motors 28 drive wheels 30 and move train set 10 along the track.

Locomotive 12 also includes a braking system 31 coupled to wheels 30 which may be activated by a locomotive engineer to slow or stop motion of train set 10. Braking system 31 may include both a friction braking system 32 and a dynamic braking system 34. When dynamic braking is activated, power from the primary power source 24 ceases and traction motors 28 are reconfigured into generators that rotate and produce electrical energy due to the forward momentum of locomotive 12 and attached railcars 14. When propulsion system 23 is in the dynamic braking mode of operation, a drag is produced on the traction motors/generators 28, which provides a braking effect. The excess electrical energy which is generated during the dynamic braking mode is returned to the traction bus 26 for capture and use as will be described below.

As shown in FIG. 1, locomotive 12 further includes a head end power (HEP) system 36 which is coupled to traction bus 26. HEP system 36 captures the excess electrical energy that is generated during the dynamic braking mode and uses the energy to charge a storage device, such as batteries, capacitors, etc. The stored energy is then inverted into AC current or otherwise converted into appropriate head end power which is provided to one or more railcars 14 via an HEP bus 38 and electrical coupling connection 18. HEP system 36 is configured such that the head end power is substantially continuously available as long as railcar 14 is in use. The amount of head end power provided by HEP system 36 may vary depending on the configuration and type of passenger train set 10. Generally, approximately 25-100 kilowatts (KW) of head end power is provided to each railcar 14. A passenger train set 10 typically may include three to eight railcars 14 and, thus, HEP system 36 may provide 75 to 800 kW of head end power. However, HEP system 36 may be configured to provide more or less head end power as needed.

Returning to the embodiment illustrated in FIG. 1, each railcar 14 includes a housekeeping power system 40 which receives the head end power from HEP bus 38. Housekeeping power system 40 uses the head end power to provide electrical energy for various housekeeping functions such as ambient lighting 42, electrical outlets 44, heating and cooling system 46, as well as any miscellaneous other housekeeping applications 48. Housekeeping power system 40 may include any suitable combination of logic and power conversion components to control and regulate the head end power received from HEP bus 38 to provide appropriate power for the various housekeeping applications present in railcar 14.

In some situations, the dynamic braking mode of operation may not provide enough excess electrical energy to continuously power the housekeeping systems on the attached railcars 14. As such, HEP system 36 may be configured to supplement the excess electrical energy captured from traction bus 26 with energy generated by the primary power source 24. For instance, HEP system 36 may be configured such that at least a portion of the head end power is always derived from primary energy produced by the primary power source 24. HEP system 36 also may be configured such that it draws power from the primary power source 24 only when the amount of stored energy falls below a minimum threshold. This situation may occur, for instance, due to increased demand for head end power from railcars 14 or when the dynamic braking mode of operation has not been activated for sufficient periods of time to provide enough excess electrical energy to maintain an adequate charge in storage system 58 to meet the normal continuous demand for head end power. Yet further, HEP system 36 may be configured to draw power from the primary power source 24 only when the dynamic braking mode of operation is not activated. HEP system 36 also may be configured to draw power from primary power source 24 either when the train set 10 is at rest, after extended periods of non-use of locomotive 12 (such as when the locomotive 12 has been down for repairs or maintenance), or whenever locomotive 12 is in the motoring mode.

It is envisioned that HEP system 36 may be adapted to operate in any one or any combination of the configurations discussed above or other configurations in which primary energy supplements the excess electrical energy. However, regardless of the particular configuration, the capture and use of excess electrical energy generated during dynamic braking means that the diversion of power available for motoring and acceleration is minimized. Moreover, because HEP system 36 captures and stores the excess electrical energy in a storage device, a separate generator or engine is not needed to generate head end power. Thus, a passenger train set 10 equipped with HEP system 36 may have reduced ambient noise levels, use less fuel, and produce lower levels of undesirable emissions as compared to passenger train sets which do have a separate or dedicated head end power generator or engine.

Supplementing the stored excess electrical energy with energy produced by primary power source 24 may be unnecessary in certain circumstances. For instance, as passenger train sets 10 typically slow down or come to a stop every 5 to 6 minutes, the amount of excess electrical energy generated during the dynamic braking mode of operation may be more than sufficient to power all housekeeping applications. In such a case, any excess electrical energy which is not captured and stored by HEP system 36 may be transferred to a grid system 50 (e.g., a resistor grid) where it is converted to thermal energy and dissipated through the cooling effect of a fan system 52. In addition to grid circuitry, grid system 50 may include appropriate switching devices to control the flow of surplus excess electrical energy to grid system 50 for dissipation as thermal energy.

Locomotive 12 also has its own various non-motoring needs which require power. As shown in FIG. 1, locomotive 12 includes an auxiliary generator 54 that provides auxiliary power for such non-motoring uses, including locomotive lighting, heating, cooling, and generator excitation. In FIG. 1, auxiliary generator 54 is driven by primary engine 22. However, in other embodiments of the invention, auxiliary generator 54 may be eliminated and HEP system 36 may be configured to provide auxiliary power from the energy that system 36 has captured and stored, as will be explained below.

Figure 2:
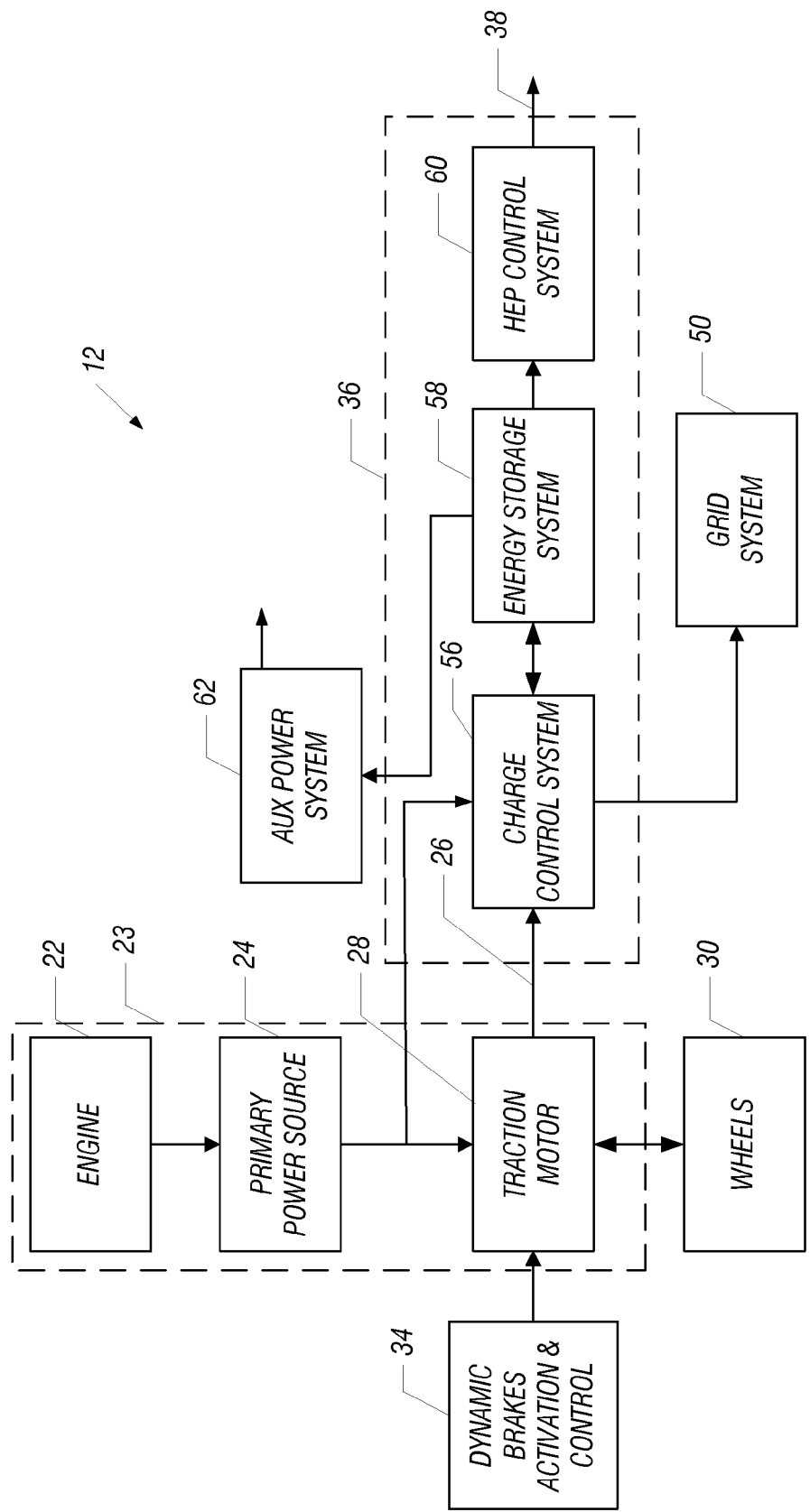
FIG. 2 is a block diagram illustrating one embodiment of a hybrid head end power system carried on board the passenger locomotive.

Turning now to FIG. 2, a block diagram of exemplary systems carried on board locomotive 12 is illustrated. As shown in FIG. 2, HEP system 36 includes a charge control system 56, an energy storage system 58, and an HEP control system 60. In this embodiment, charge control system 56 is coupled to traction bus 26 and to primary power source 24 such that charge control system 56 may charge energy storage system 58 from either or both the primary electrical energy generated by primary power source 24 and excess electrical energy generated by traction motors 28 during dynamic braking. Energy storage system 58 may include various types of storage devices, such as batteries, capacitors, fuel cells or any combination of various types of storage devices. Charge control system 56 may be any type of electrical system having the appropriate combination of logic, switching and power components suitable for selectively charging the particular type of energy storage system 58 from either or both the primary electrical energy and the excess electrical energy created from dynamic braking.

HEP control system 60 inverts the energy stored in energy storage system 58 into AC power for transmission on HEP bus 38. HEP control system 60 is further configured to control the rate of discharge of the energy storage system 58 and to regulate the AC power that is transmitted as head end power on HEP bus 38. System 60 may be any type of system having the appropriate combination of logic, switching and power components to perform, for instance, the control and power inversion discussed above.

In the embodiment illustrated in FIG. 2, HEP system 36 also provides power to an auxiliary power system 62. System 62 converts the power provided by HEP system 36 into power required for auxiliary uses on the locomotive 12 itself. Typically, the amount of auxiliary power needed on a locomotive is in the range of 10 KW to 20 KW. By configuring HEP system 36 and auxiliary power system 62 to provide the auxiliary power, auxiliary generator 54 shown in FIG. 1 may be eliminated.

Figure 3:
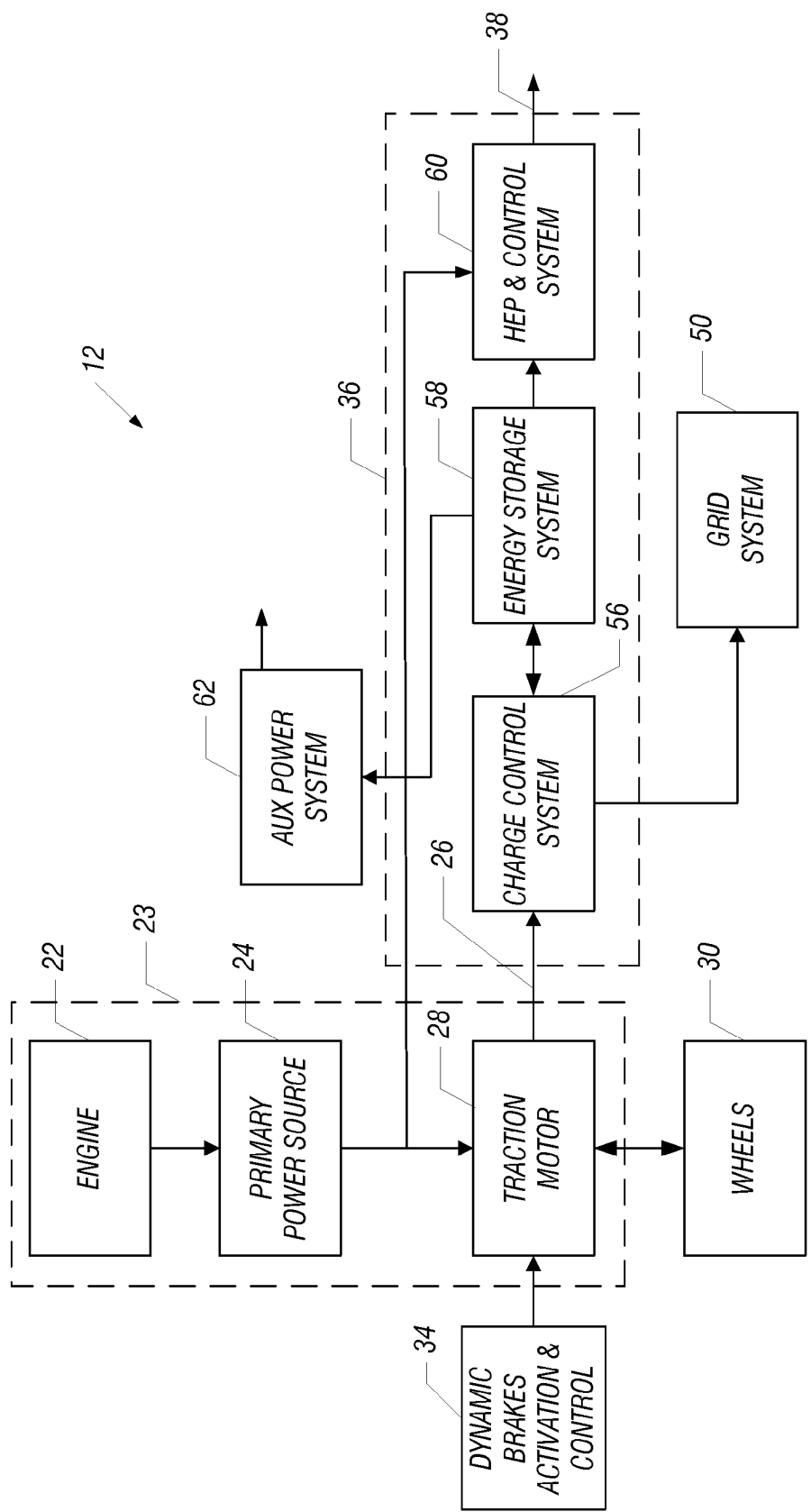
FIG. 3 is a block diagram illustrating another embodiment of a hybrid head end power system carried on board the passenger locomotive.

FIG. 3 illustrates yet another exemplary embodiment of the systems carried on board a locomotive 12. In this embodiment, primary electrical energy generated by primary power source 24 is not stored in storage system 58 but is coupled to HEP control system 60. HEP control system 60 may be configured to provide head end power on HEP bus 38 from the primary electrical energy generated by primary power source 24 as needed. For instance, a portion of the HEP power on bus 38 may always be produced at least in part from primary electrical energy generated by primary power source 24. Or, as discussed above, the primary electrical energy may be used only when insufficient energy is available from energy storage system 58 to supply the demand for head end power. Yet further, HEP control system 60 may be configured to produce at least a portion of the head end power from primary electrical energy only when traction motors 28 are not in the dynamic braking mode of operation.

Existing passenger train sets may be retrofitted with HEP system 36. For instance, an existing HEP system that includes a separate engine and/or generator for providing head end power to the passenger railcars may be removed and readily replaced with a charge control system 56, storage device 58, and an HEP control system 60. The input of charge control system 56 is coupled to the existing traction bus 26 in the locomotive and the output of HEP control system 60 is coupled to the existing HEP bus 38 in the locomotive. Charge control system 56 may also be coupled to the existing grid system 50 in the locomotive so that any surplus excess electrical energy that is generated during dynamic braking may be dissipated as thermal energy. HEP system 36 also is coupled to the existing primary power source 24 so that primary energy generated by power source 24 can be used to supplement the energy stored in storage device 58 as needed.

Although the foregoing embodiments have entailed the capture of dynamic braking energy for use as head end power for passenger railcars and auxiliary power for the locomotive, HEP system 36 may also be configured to provide the stored energy for other uses.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of retrofitting a passenger locomotive with a hybrid energy head end power (HEP) system to provide head end power that is substantially continuously provided to a passenger railcar while the locomotive is in use, the locomotive operable in a motoring mode and a dynamic braking mode while the locomotive is in use, the locomotive having a primary power source that provides primary electrical energy to power a traction motor when in the motoring mode, and the traction motor generating excess electrical energy when the locomotive is in the dynamic braking mode, the method comprising:
    installing an HEP energy storage system on the locomotive, the HEP energy storage system to store the excess electrical energy generated by the traction motor during operation of the locomotive in the dynamic braking mode;
    electrically connecting the HEP energy storage system to the traction motor;
    electrically connecting the HEP energy storage system to the primary power source, wherein the primary power source is electrically connected to a traction bus to provide the primary electrical energy to the traction motor for propulsion of the locomotive; and
    electrically connecting the HEP energy storage system to an HEP bus;
    wherein the HEP energy storage system is further to generate head end power that is suitable for non-motoring use by a passenger railcar by converting the stored excess electrical energy and primary electrical energy into the head end power and providing the head end power to the HEP bus substantially continuously while the passenger locomotive is in use.

2. The method as recited in claim 1, comprising coupling the HEP energy storage system to a grid system, and wherein the HEP energy storage system is to transfer surplus excess electrical energy generated during the dynamic braking mode to the grid system.

3. The method as recited in claim 1, wherein the HEP energy storage system is to generate at least a portion of the head end power from the primary electrical energy when the stored excess electrical energy falls below a threshold.

4. The method as recited in claim 1, wherein the HEP energy storage system comprises a charging system and a storage device, and the charging system is to selectively charge the storage device from at least one of the excess electrical energy and the primary electrical energy.

5. The method as recited in claim 4, wherein the HEP energy storage system is to charge the storage device from the primary electrical energy only when the energy stored in the storage device falls below a minimum threshold.

6. The method as recited in claim 4, wherein the HEP energy storage system is to charge the storage device from the primary electrical energy only when the passenger locomotive is not operating in the dynamic braking mode.

7. The method as recited in claim 1, wherein the HEP energy storage system is to provide at least a portion of the head end power to the HEP bus from the primary electrical energy when the passenger locomotive is not operating in the braking mode.

8. The method as recited in claim 1, further comprising electrically connecting the HEP energy storage system to an auxiliary power system that provides auxiliary power for non-motoring use on the passenger locomotive so that the auxiliary power system can provide the auxiliary power from the stored excess electrical energy.

9. The method as recited in claim 1, wherein the HEP energy storage system comprises a battery to store the excess electrical energy.

10. The method as recited in claim 1, wherein the HEP energy storage system comprises a capacitor bank to store the excess electrical energy.

* * * * *